US006793730B2

(12) United States Patent
Reddy et al.

(10) Patent No.: US 6,793,730 B2
(45) Date of Patent: *Sep. 21, 2004

(54) METHODS OF CEMENTING

(75) Inventors: B. Raghava Reddy, Duncan, OK (US);
Ronald J. Crook, Duncan, OK (US);
Russell M. Fitzgerald, Waurika, OK
(US); Bryan K. Waugh, Comanche,
OK (US)

(73) Assignee: Halliburton Energy Services, Inc.,
Duncan, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/454,053

(22) Filed: Jun. 4, 2003

(65) Prior Publication Data

US 2003/0217847 A1 Nov. 27, 2003

Related U.S. Application Data

(63) Continuation of application No. 10/213,772, filed on Aug. 7, 2002, now Pat. No. 6,630,021, which is a division of application No. 09/789,428, filed on Feb. 21, 2001, now Pat. No. 6,454,004, which is a continuation-in-part of application No. 09/501,337, filed on Feb. 9, 2000, now Pat. No. 6,273,191, which is a continuation-in-part of application No. 09/353,676, filed on Jul. 15, 1999, now Pat. No. 6,336,505.

(51) Int. Cl.$^7$ .................. C04B 24/16; C04B 24/06; C04B 38/00; E21B 33/14

(52) U.S. Cl. ................ 106/677; 106/639; 106/678; 106/724; 106/725; 106/727; 106/728; 106/802; 106/808; 106/809; 106/810; 106/823; 166/293; 507/202; 507/260

(58) Field of Search .................. 106/639, 677, 106/678, 724, 725, 727, 728, 802, 808, 809, 810, 823; 166/293; 507/202, 260

(56) References Cited

U.S. PATENT DOCUMENTS

| | | | |
|---|---|---|---|
| 3,359,225 A | 12/1967 | Weisend ................ 260/29.6 |
| 3,844,351 A | 10/1974 | Sutton et al. ............ 166/293 |
| 3,926,650 A | 12/1975 | Lange et al. ............. 106/90 |
| 3,937,282 A | 2/1976 | Shryock et al. .......... 166/293 |
| 4,028,125 A | 6/1977 | Martin .................. 106/89 |
| 4,160,674 A | 7/1979 | Sawyer .................. 106/89 |
| 4,304,298 A | 12/1981 | Sutton .................. 166/293 |
| 4,415,366 A | 11/1983 | Copening ................ 106/86 |
| 4,466,833 A | 8/1984 | Spangle ................. 106/88 |
| 4,482,379 A | 11/1984 | Dibrell et al. ............ 106/76 |
| 4,557,763 A | 12/1985 | George et al. ............ 106/90 |
| 4,676,832 A | 6/1987 | Childs et al. ............ 106/90 |
| 4,761,183 A | 8/1988 | Clarke ................. 106/117 |
| 4,846,888 A | 7/1989 | Detroit ................. 106/93 |
| 5,016,711 A | 5/1991 | Cowan ................. 166/250 |
| 5,049,288 A | 9/1991 | Brothers et al. ......... 252/8.551 |
| 5,071,484 A | 12/1991 | Bonifay et al. ........... 106/692 |
| 5,086,850 A | 2/1992 | Harris et al. ............. 175/61 |
| 5,121,795 A | 6/1992 | Ewert et al. ............. 166/292 |
| 5,123,487 A | 6/1992 | Harris et al. ............. 166/277 |
| 5,125,455 A | 6/1992 | Harris et al. ............. 166/292 |
| 5,127,473 A | 7/1992 | Harris et al. ............. 166/277 |
| 5,133,409 A | 7/1992 | Bour et al. .............. 166/293 |
| 5,147,565 A | 9/1992 | Bour et al. ............ 252/8.551 |
| 5,284,512 A | 2/1994 | Koskan et al. ........... 106/416 |
| 5,340,860 A | 8/1994 | Brake et al. ............ 524/166 |
| 5,346,550 A | 9/1994 | Kunzi et al. ............ 106/709 |
| 5,447,198 A | 9/1995 | Kunzi et al. ............ 166/293 |
| 5,484,019 A | 1/1996 | Griffith ................ 166/293 |
| 5,569,324 A | 10/1996 | Totten et al. ............ 106/696 |
| 5,571,318 A | 11/1996 | Griffith et al. ........... 106/725 |
| 5,580,378 A | 12/1996 | Shulman ................ 106/677 |
| 5,588,489 A | 12/1996 | Chatterji et al. .......... 166/293 |
| 5,688,844 A | 11/1997 | Chatterji et al. ........... 524/8 |
| 5,696,059 A | 12/1997 | Onan et al. ............. 507/269 |
| 5,705,599 A | 1/1998 | Felixberger et al. ........ 528/227 |
| 5,711,801 A | 1/1998 | Chatterji et al. .......... 106/789 |
| 5,806,594 A | 9/1998 | Stiles et al. ............. 166/293 |

(List continued on next page.)

FOREIGN PATENT DOCUMENTS

| | | | | |
|---|---|---|---|---|
| EP | 0 204 370 A1 | 12/1986 | .......... C04B/24/16 |
| EP | 0 816 300 A2 | 1/1998 | .......... C04B/28/04 |
| EP | 1 069 091 A1 | 1/2001 | .......... C04B/28/04 |
| EP | 1 123 907 A2 | 8/2001 | .......... C04B/28/02 |
| EP | 1 238 952 A1 | 9/2002 | .......... C04B/28/02 |
| WO | WO 00/00536 | 1/2000 | .......... C08G/81/00 |
| WO | WO 00/09459 | 2/2000 | .......... C04B/28/02 |
| WO | WO 00/09460 | 2/2000 | .......... C04B/28/02 |
| WO | WO 00/35965 | 6/2000 | ............ C08F/8/32 |

OTHER PUBLICATIONS

Publication entitled *Cementing* by Dwight K. Smith, Second Printing 1990, pp. 18–20, no month.

Donlar® Higher Molecular Weight Polymers Technical Bulletin dated Apr. 24, 1998.

Donalr® Low Molecular Weight Polymers Technical Bulletin dated Apr. 24, 1998.

*Primary Examiner*—Anthony J. Green
(74) *Attorney, Agent, or Firm*—Craig W. Brady; C. Clark Dougherty, Jr.

(57) ABSTRACT

The present invention provides improved methods for cementing. The methods are basically comprised of the steps of preparing a cement composition comprised of hydraulic cement, water, gas, surfactants, a cement early strength accelerator and a mildly set retarding cement dispersing agent, placing the cement composition in the annulus between the casing string and the well bore and allowing the cement composition to set into a hard impermeable mass. The cement composition used can alternatively comprise hydraulic cement, a water reducing additive, a dispersing additive, a set accelerating additive and water. Also, the cement composition can be made environmentally benign by using water reducing and dispersing additives, set retarding additives, and compressive strength and set accelerating additives which are environmentally degradable.

57 Claims, No Drawings

U.S. PATENT DOCUMENTS

| | | | |
|---|---|---|---|
| 5,820,670 A | 10/1998 | Chatterji et al. | 106/727 |
| 5,876,623 A | 3/1999 | Tang et al. | 252/180 |
| 5,897,699 A | 4/1999 | Chatterji et al. | 106/678 |
| 5,908,885 A | 6/1999 | Sikes et al. | 524/5 |
| 6,019,835 A | 2/2000 | Chatterji et al. | 106/725 |
| 6,063,738 A | 5/2000 | Chatterji et al. | 507/269 |
| 6,133,347 A | 10/2000 | Vickers, Jr. et al. | 524/8 |
| 6,136,950 A | 10/2000 | Vickers, Jr. et al. | 528/363 |
| 6,145,591 A | 11/2000 | Boncan et al. | 166/291 |
| 6,153,673 A | 11/2000 | Lemos et al. | 524/5 |
| 6,174,980 B1 | 1/2001 | Hirata et al. | 526/320 |
| 6,182,758 B1 | 2/2001 | Vijn | 166/293 |
| 6,220,354 B1 | 4/2001 | Chatterji et al. | 166/293 |
| 6,227,294 B1 | 5/2001 | Chatterji et al. | 166/293 |
| 6,273,191 B1 * | 8/2001 | Reddy et al. | 166/293 |
| 6,336,505 B1 | 1/2002 | Reddy | 166/293 |
| 6,419,016 B1 | 7/2002 | Reddy | 166/293 |
| 6,454,004 B2 | 9/2002 | Reddy et al. | 166/293 |
| 6,630,021 B2 * | 10/2003 | Reddy et al. | 106/809 |
| 2003/0006038 A1 | 1/2003 | Reddy et al. | 166/293 |

* cited by examiner

METHODS OF CEMENTING

CROSS-REFERENCE TO RELATED APPLICATIONS

This application is a continuation of application Ser. No. 10/213,772 filed Aug. 7, 2002, now U.S. Pat. No. 6,630,021 which is a divisional of application Ser. No. 09/789,428 filed Feb. 21, 2001, U.S. Pat. No. 6,454,004, which is a continuation-in-part of application Ser. No. 09/501,337 filed Feb. 9, 2000, U.S. Pat. No. 6,273,191, which is a continuation-in-part of application Ser. No. 09/353,676 filed Jul. 15, 1999, U.S. Pat. No. 6,336,505, the disclosures of which are incorporated herein by reference.

BACKGROUND OF THE INVENTION

1. Field of the Invention

The present invention relates to cement compositions and methods of cementing casing strings in well bores.

2. Description of the Prior Art

In carrying out completion operations in oil and gas wells, hydraulic cement compositions are commonly utilized. For example, hydraulic cement compositions are used in primary cementing operations whereby casing strings are cemented in well bores. That is, a hydraulic cement composition is pumped into the annular space between the walls of a well bore and the exterior of a casing string disposed therein. The cement composition is permitted to set in the annular space thereby forming an annular sheath of hardened impermeable cement therein. The objective of the cement sheath is to physically support and position the casing string in the well bore and bond the casing string to the walls of the well bore whereby the undesirable migration of fluids between zones or formations penetrated by the well bore is prevented.

Primary cementing operations in deep water offshore wells are particularly difficult in that they are carried out in well bores which penetrate formations between the sea floor or mud line and a depth generally under about 2,000 feet below the mud line. Such formations are often not well consolidated, readily fracture and often have highly pressured water flows therethrough. For example, the fracture gradients in subsea well bores in which conductor and/or surface casing strings are cemented limit the densities of the cement compositions utilized to 11 or 12 pounds per gallon. The high water flows through the well bores often wash away cement compositions which have densities below 10 to 11 pounds per gallon.

Another problem involved in deep water offshore well cementing is the temperature at which the cement composition must set. Deep water offshore wells typically have sea bottom temperatures ranging from about 32° F. to 55° F. depending on the geographical location. The cement compositions utilized for performing cementing operations at such temperatures must set and provide enough compressive strength to proceed with drilling without involving long waiting-on-cement (WOC) times, preferably less than 24 hours. Accordingly, the cement compositions must include set and strength accelerating agents to allow the cement compositions to set at the low temperatures involved and develop early compressive strengths. However, a problem in the use of set and strength accelerating agents is that they often cause the cement compositions to have thickening times which are too short to allow placement of the cement compositions in the formations or zones to be cemented. Thus, the cement compositions used in deep offshore wells must have adequate pumping times to allow placement, but at the same time they must set and develop sufficient compressive strengths to allow further drilling as quickly as possible. The generally accepted requirements for cement compositions to overcome the above described problems in the Gulf Coast region of the United States include cement composition densities in the range of from 10 to 12 pounds per gallon, thickening times of from 3 to 5 hours and compressive strengths of from 400 to 600 psi at temperatures of from about 45° F. to about 55° F.

Foamed cement compositions have heretofore been utilized in deep water offshore wells to obtain the low densities required. Set and strength accelerating agents such as calcium chloride have also been used to provide short thickening times at the low temperatures involved. To obtain the required compressive strengths at the low temperatures, cement blends containing at least two different cements have heretofore been used. For example, U.S. Pat. No. 5,571,318 issued to Griffith et al. on Nov. 5, 1996 discloses cementing compositions for use in cold environments which are comprised of a relatively coarse particulate hydraulic cement mixed with an ultra fine particulate hydraulic cement. U.S. Pat. No. 5,806,594 issued to Stiles et al. on Sep. 15, 1998 discloses foamed cement compositions containing calcium sulfate cement and Portland cement.

API oil well cements are generally used in deep water offshore wells, and frequently, different classes of such cements must be used for cementing at different depths due to the temperature differences. The use of two or more different cements, for whatever purpose in drilling an offshore well, requires multiple cleanings of the bulk cement tanks located at the drilling rig platform as well as numerous trips to on-shore blending facilities for transporting the different cements to the platform. Thus, there is a need for a cement composition containing a single cement which can be used for cementing at various depths in an offshore well. The use of such a cement composition would be highly economical as well as environmentally preferable.

Another problem associated with offshore wells involves the use of dry additives such as set and compressive strength accelerating agents, set retarders, dispersing agents and the like in the cement compositions used. The use of dry additives requires the cement to be dry blended with the dry additives on-shore and the resulting blend to be transferred to the offshore platform where the dry blend is mixed with seawater. The blends can generally be used only for cementing at certain depths due to the differences in temperatures, fracture gradients and water flows. As a result, unused portions of specific cement blends have to be discarded and replaced with newly prepared blends. Again, this procedure wastes time and money in that it involves additional trips between the on-shore blending facility and the drilling platform. etc.

Thus, if only one basic cement is utilized and if the various additives are added in liquid form to the mix water or slurry on the offshore platform just prior to cementing, the bulk-cement inventory will be limited to one dry cement on the platform that can be used throughout the completion of the well, decisions on the precise nature of the cement composition to be used can be deferred until it is time to begin the cementing process and the operator will use only as much cement and liquid additives needed without generating costly waste and lost time.

Another problem which has often heretofore been encountered in deep water offshore well cementing is the inflow of formation fluids, e.g., water, gas and/or oil, into a cement composition which has been placed in the annulus between a casing string and the walls of a well bore, but which has not yet set. Such inflow of formation fluids is generally caused by the cement composition becoming partially self-supporting and the consequent loss of the ability of the cement column in the annulus to transmit hydrostatic pressure. When the pressure exerted by the cement composition falls below the pressure of formation fluids, the formation fluids enter the annulus and flow through the cement composition whereby flow channels are formed therein which remain after the cement composition is completely set. The loss of the ability of the cement column to transmit hydrostatic pressure can result from the cement composition having too long a transition time, i.e., the time interval between when the cement composition begins to develop static gel strength and when the cement composition has sufficient gel strength to prevent the inflow of formation fluids. At the low temperatures encountered in offshore wells, it has heretofore been difficult if not impossible to shorten the transition times of cement compositions enough to eliminate formation fluid inflow and the problems associated therewith. Thus, there are needs for improved cement compositions and methods of cementing casing strings in offshore well bores using the cement compositions whereby formation fluid inflow is prevented.

Another problem encountered in offshore well cementing involves the use of additives such as water reducing agents, dispersing agents, foaming and foam stabilizing surfactants, set retarding agents and the like which are not environmentally degradable. That is, when cement composition additives which are not fully degradable in the environment are utilized in offshore applications they find their way into the seawater and interfere with aquatic life cycles therein. Thus, there are needs for improved well cement compositions containing environmentally degradable additives and methods of using the compositions in offshore well applications.

SUMMARY OF THE INVENTION

The present invention provides improved methods of cementing casing strings in deep water offshore formations penetrated by well bores which meet the needs described above and overcome the deficiencies of the prior art. A method of this invention basically comprises the steps of preparing a cement composition comprised of a single hydraulic cement, mix water, a gas for foaming the composition, a mixture of foaming and foam stabilizing surfactants, a cement set and strength accelerating agent and a mildly set retarding cement dispersing agent; placing the cement composition in the annulus between a casing string and a well bore; and allowing the cement composition to set into a hard impermeable mass.

The set and strength accelerating agent and the mildly set retarding dispersing agent are present in the cement composition in a weight ratio and in an amount such that the cement composition has a thickening time in the range of from about three to about five hours and develops a compressive strength about 400 psi at a temperature in the range of from about 45° F. to about 55° F. within twenty-four hours.

The preferred set and strength accelerating agent is calcium chloride and the preferred mildly set retarding cement dispersing agent is sulfonated naphthalene formaldehyde condensate. Generally, these components are varied in the cement composition in a weight ration from about 1:1 to about 3:1 in order to obtain the required thickening time at the temperature of the subterranean zone in which a casing string is to be cemented.

With the exception of the cement and the gas utilized to foam the cement composition, all of the other components of the cement composition can be in liquid form.

It is, therefore, a general object of the present invention to provide improved method of cementing casing strings in wells.

A further object of the present invention is the provision of methods of cementing casing strings in deep water offshore wells utilizing a cement composition comprised of a single hydraulic cement, mix water and other additives which can all be added to the mix water or cement slurry in liquid form.

Another method of this invention basically comprises the steps of preparing a cement composition comprised of a hydraulic cement, a water reducing additive comprised of a sulfonated naphthalene-formaldehyde condensate, a dispersing additive comprised of the condensation product of acetone, formaldehyde and an alkali metal bisulfite, a compressive strength enhancing and set retarding additive comprised of a copolymer of acrylic acid and 2-acrylamido-2-methylpropane sulfonic acid, a set accelerating additive and water present in an amount sufficient to form a pumpable slurry; placing the cement composition in the annulus between a casing string and a well bore; and allowing the cement composition to set into a hard impermeable mass.

Depending on the temperature of the well being cemented and the level of tricalcium aluminate in the particular hydraulic cement used, additional calcium aluminate can be included in the cement composition to help shorten the cement composition transition time. When a low density cement composition must be used to prevent fractures from being formed in subterranean formations penetrated by the well bore, the above described cement composition can be foamed, i.e., it can include a gas in an amount sufficient to foam the cement composition and a mixture of cement composition foaming and foam stabilizing surfactants in an effective amount. With the exception of the cement and the gas utilized to foam the cement composition, all of the other components of the cement composition can be in liquid form.

The present invention also provides improved cement compositions containing environmentally degradable additives and methods of cementing casing strings in offshore formations penetrated by well bores which meet the needs described above and overcome the deficiencies of the prior art. The improved cement compositions of the invention containing environmentally degradable additives are basically comprised of a single hydraulic cement, sufficient water to form a pumpable slurry, a water reducing and dispersing additive comprised of polyaspartic acid, a set retarding additive comprised of a lignosulfonate salt, and a compressive strength and set accelerating additive comprised of a water soluble calcium salt.

Methods of this invention for using cement compositions containing environmentally degradable additives basically comprise the steps of preparing a cement composition of the invention; placing the cement composition in the annulus between a casing string and a well bore; and allowing the cement composition to set into a hard impermeable mass therein.

It is, therefore, a general object of the present invention to provide improved well cement compositions containing environmentally degradable liquid additives and methods of cementing casing strings in wells using the compositions.

A further object of the present invention is the provision of methods of cementing casing strings in deep water offshore wells utilizing cement compositions comprised of a single hydraulic cement, water and liquid additives which can all be added to the mix water or cement slurry and which are environmentally degradable.

Other and further objects, features and advantages of the present invention will be readily apparent to those skilled in the art upon a reading of the description of the preferred embodiments which follows.

DESCRIPTION OF PREFERRED EMBODIMENTS

The present invention provides an improved method of cementing a casing string in a deep water offshore formation or zone penetrated by a well bore using a cement composition comprised of a single hydraulic cement and other components which can all be added to the mix water or cement slurry in liquid form. The cement compositions of this invention can be utilized over a broad temperature range, e.g., from about 32° F. to about 80° F. by simply changing the weight ratio and quantities of certain of the components in the composition. Further, the cement compositions can meet the generally accepted requirements for cementing casing strings in deep water offshore wells, namely, a cement composition density in the range of from 10 to 12 pounds per gallon, a thickening time of from 3 to 5 hours and compressive strengths of from 400 psi to 600 psi at 45° F. to 55° F. The methods allow the operator of an offshore platform to keep a single dry cement in bulk storage on the platform along with the other components of the cement composition which except for the gas utilized to foam the composition can all be in liquid form. The liquid components can be added to the single cement just prior to cementing whereby the operator uses only as much dry cement and liquid components as are needed without generating waste and losing time by changing cements, etc.

As mentioned, the cement compositions and methods of the present invention are particularly suitable for cementing conductor and/or surface casing strings in deep water offshore formations or zones penetrated by well bores. The cement composition of the invention can be used in shallow high water flow formations in which conductor and/or surface casing strings are cemented as well as in the deeper, warmer formations in which other casing strings or liners are cemented. Generally, the cementing composition of this invention can be utilized for cementing wells at depths from 0 to 8,000 feet and deeper.

An improved method of this invention for cementing a casing string in a deep water offshore formation or zone penetrated by a well bore is basically comprised of the following steps. A cement composition is prepared comprised of a single hydraulic cement, sufficient water to form a pumpable slurry, a gas present in an amount sufficient to form a foam, a mildly set retarding mixture of cement composition foaming and foam stabilizing surfactants present in an effective amount, a cement set and strength accelerating agent and a mildly set retarding cement dispersing agent. The cement set and strength agent and the mildly set retarding cement dispersing agent are present in a weight ratio and in an amount such that the cement composition has a required thickening time, generally in the range of from about 3 to about 5 hours, and develops adequate compressive strength, generally in the range of from about 400 psi to about 600 psi, at a temperature in the range of from about 45° F. to about 55° F. within a time period of 24 hours or less. Upon being prepared, the cement composition is placed in the annulus between the casing string and the well bore, and the cement composition is allowed to set into a hard impermeable mass therein.

The single hydraulic cement preferred for use in accordance with this invention is API Classes A, C, H and G Portland cement which is defined and described in *API Specification For Materials And Testing For Well Cements*, API Specification 10, Fifth Edition, dated Jul. 1, 1990, of the American Petroleum Institute. Other cements which are equivalent to API Portland cements can also be used. As mentioned above, API Portland cements, or other cements which are equivalent thereto, are suitable for cementing deep water offshore wells from 0 to 8,000 feet when used with the other components of the cement compositions of this invention.

The water in the cement composition can be freshwater or salt water. The term "salt water" is used herein to mean unsaturated salt solutions and saturated salt solutions including brines and seawater. The water is generally present in the cement composition in an amount sufficient to form a pumpable slurry, and more specifically, in an amount in the range of from about 34% to about 40% by weight of cement in the cement composition.

The gas utilized for foaming the cement composition can be air or nitrogen, with nitrogen being preferred. The gas is present in an amount sufficient to foam the cement composition to a density in the range of from about 10 to about 12 pounds per gallon.

A mildly set retarding mixture of cement composition foaming and foam stabilizing surfactants which is particularly suitable for use in accordance with this invention is comprised of a mixture of an ethoxylated alcohol ether sulfate surfactant of the formula:

$$H(CH_2)_a(OC_2H_4)_bOSO_3NH_4^+$$

wherein a is an integer in the range of from about 6 to about 10 and b is an integer in the range of from about 3 to about 10, an alkyl or alkene amidopropylbetaine surfactant having the formula:

$$R-CONHCHCH_2CH_2N^+(CH_3)_2CH_2CO_2^-$$

wherein R is a radical selected from the group of decyl, cocoyl, lauryl, cetyl and oleyl and an alkyl or alkene amidopropyl dimethylamine oxide surfactant having the formula:

$$R-CONHCH_2CH_2CH_2N^+(CH_3)_2O^-$$

wherein R is a radical selected from the group of decyl, cocoyl, lauryl, cetyl and oleyl.

The ethoxylated alcohol ether sulfate surfactant is generally present in the mixture in an amount in the range of from about 60 to about 64 parts by weight; the alkyl or alkene amidopropylbetaine surfactant is generally present in the mixture in an amount in the range of from about 30 to about 33 parts by weight; and the alkyl or alkene amidopropyl dimethylamine oxide surfactant is generally present in an amount in the range of from about 3 to about 10 parts by weight. The mixture can be comprised of the surfactants, per se, but more preferably, the mixture includes fresh water in an amount sufficient to dissolve the surfactants whereby it can more easily be combined with the cement composition mixing water or cement slurry.

Another mildly set retarding mixture of foaming and foam stabilizing surfactants which can be utilized is a mixture of the ethoxylated alcohol ether sulfate described above and the alkyl or alkene amidopropylbetaine surfactant described above. This mixture of surfactants is generally comprised of two parts by weight of the ethoxylated alcohol ether sulfate and one part by weight of the alkyl or alkene amidopropylbetaine surfactant. This mixture also preferably includes fresh water in an amount sufficient to dissolve the surfactants.

The mildly set retarding mixture of foaming and foam stabilizing surfactants utilized is generally included in the cement composition of this invention in an amount in the range of from about 0.1% to about 4% by weight of water in the cement composition.

While a variety of cement set accelerating additives (also referred to herein as set and strength accelerating agents) can be utilized in the cement compositions of this invention, a water soluble calcium salt such as calcium chloride, calcium nitrite and calcium formate is preferred with calcium chloride being the most preferred. While the set accelerating additive can be utilized directly, it is preferably dissolved in fresh water so that it can be added to the mix water or cement slurry on location. Most preferably, the set accelerating additive is in the form of an aqueous solution wherein the set accelerating additive is present therein in an amount of about 33% by weight of the solution.

The mildly set retarding cement dispersing agent is preferably a sulfonated naphthalene formaldehyde condensate which is commercially available from Halliburton Energy Services of Duncan, Okla., under the trade name "CFR-2™."

Another mildly set retarding cement dispersing agent which can be utilized is the condensation product of acetone, formaldehyde and sodium bisulfite which is also commercially available from Halliburton Energy Services of Duncan, Okla., under the trade name "CFR-3™." Like the cement set and strength accelerating agent described above, the mildly set retarding cement dispersing agent utilized is preferably dissolved in fresh water in an amount of about 33% by weight of the solution.

As mentioned, the ratio of the cement set and strength accelerating agent to the mildly set retarding cement dispersing agent and the amount of the accelerating agent and dispersing agent together in the cement composition can be varied to vary the thickening time and compressive strength of the cement composition at specific temperatures, e.g., a thickening time of from about 3 to about 5 hours and a compressive strength from about 400 psi to about 600 psi at temperatures in the range of from about 45° F. to about 55° F. within 24 hours. Generally, the ratio of the set and strength accelerating agent to the mildly set retarding water dispersing agent is varied in the range of from about 1:1 to about 3:1. The amount of the accelerator and dispersing agent together present in the cement composition is generally within the range of from about 1% to about 3% by weight of cement in the composition.

As will be understood by those skilled in the art, in specific applications and at specific depths in deep water offshore wells, other additives, preferably in liquid form, which are well known to those skilled in the art and which do not adversely affect the required properties of the cement composition can be included therein, e.g., a fluid loss control agent and/or a supplemental set retarding agent.

It has been discovered that aqueous cement compositions formed with API Classes A, C, H and G Portland or equivalent hydraulic cements can be made to have very short transition times (sometimes referred to as "right angle set cement compositions") by including certain additives in the cement compositions. Further, if the hydraulic cement used is not one of the high activity types, but instead is a low activity cement having a low content of tricalcium aluminate, calcium aluminate or one or more alkali metal aluminates can be added to the cement along with the other additives to achieve a short transition time. Calcium aluminate has the general formula $(CaO)_n(Al_2O_3)_m$ where the values of m and n are such that the amount of CaO in the calcium aluminate can vary from about 20% to about 40% by weight and the amount of the $Al_2O_3$ can vary from about 60% to about 80% by weight. Commercial calcium aluminates can also contain varying amounts of metal oxide impurities. Calcium aluminate is insoluble in water while alkali metal aluminates such as sodium aluminate are soluble in water and can be dissolved in water prior to use offshore.

An improved method of this invention for cementing a casing string in a deep water offshore formation penetrated by a well bore whereby the inflow of formation fluids into the annulus between the casing string and the walls of the well bore and into the cement composition therein is prevented is comprised of the following steps. A cement composition having a short transition time is prepared comprised of a hydraulic cement, a cement water reducing additive, a cement dispersing additive, a cement compressive strength enhancing and set-retarding additive, a cement set accelerating additive and water present in an amount sufficient to form a pumpable slurry. The prepared cement composition is placed in the annulus and then allowed to set into a hard impermeable mass therein.

The cement water reducing additive, the dispersing additive and the cement compressive strength enhancing and set retarding additive work together to reduce the amount of water in the cement composition, retard the set of the composition and increase the compressive strength of the composition when set. The amount of set accelerating additive in the composition moderates the set retardation and the compressive strength of the composition. The additives also function to de-agglomerate the hydraulic cement in the composition, i.e., to break up agglomerated cement particles in the composition into separate particles which increases the cement surface area whereby the cement hydrates faster and provides early cement composition compressive strength at low temperatures.

When a low density cement composition is required, a gas in an amount sufficient to form a foam and a mixture of cement composition foaming and foam stabilizing surfactants can be included in the above described cement composition. Also, as mentioned above, if the hydraulic cement used is a low activity cement or if a very short transition time is required, calcium aluminate or one or more alkali metal aluminates can be added to the cement composition together with the other additives described above to bring about the desired short transition time.

A preferred cement water reducing additive (also referred to in the art as a "plasticizer") for use in the compositions of this invention is a sulfonated naphthalene formaldehyde condensate. This additive allows the use of unusually small amounts of water in the cement composition to which it is added. The water reducing additive assists in dispersing particles in the water to make a useful slurry at water concentrations lower than those that would normally be sufficient. The reduced water concentrations have the effect of increasing the compressive strength of the set cement. A particularly suitable sulfonated naphthalene-formaldehyde condensate water reducing additive is described in U.S. Pat. No. 3,359,225 issued to Weisend on Dec. 19, 1967, which is incorporated herein by reference. The additive is commercially available from Halliburton Energy Services of Duncan, Okla., under the trade name "CFR-2™."

A cement dispersing additive (which also has fluid loss control properties) preferred for use in accordance with this invention is the condensation product of acetone, formaldehyde and sodium bisulfite. This dispersing additive is described in U.S. Pat. No. 4,557,763 issued to George et al., on Dec. 10, 1985, which is incorporated herein by reference. The additive is also commercially available from Halliburton Energy Services of Duncan, Okla., under the trade name "CFR-3™." Both the water reducing additive and the dispersing additive are preferably dissolved in fresh water in an amount of about 33% by weight of the solution.

As mentioned, the hydraulic cement preferred for use in accordance with this invention is one of the API Classes A, C, H and G Portland or equivalent hydraulic cements. Also mentioned, the ratio of the cement set accelerating additive to the water reducing additive or the dispersing additive, or both, and the total amount of such additives together in the cement composition, can be varied to vary the thickening time and compressive strength of the cement composition at specific temperatures, e.g., a thickening time of from about 3 to about 5 hours and a compressive strength from about 400 psi to about 600 psi at temperatures in the range of from about 45° F. to about 55° F. within 24 hours. Generally, the ratio of the set accelerating additive to the water reducing additive or dispersing additive, or both, is varied in the range of from about 1:1 to about 3:1. The amount of the set accelerating additive and the water reducing additive or dispersing additive, or both, present in the cement composition is generally within the range of from about 1% to about 3% by weight of cement in the composition.

A compressive strength enhancing and set retarding additive which is preferred for use in a cement composition of this invention is a copolymer of acrylic acid and 2-acrylamido-2-methylpropane sulfonic acid. Such an additive is described in U.S. Pat. No. 5,049,288 issued to Brothers et al., on Sep. 17, 1991, which is incorporated herein by reference. The additive is commercially available from Halliburton Energy Services of Duncan, Okla., under the trade name "SCR-100™." This additive is also preferably dissolved in fresh water in an amount of about 33% by weight of the solution.

A method of the present invention which is particularly suitable for cementing casing strings in deep water offshore formations penetrated by a well bore is comprised of the steps of: (a) preparing a cement composition comprised of a single hydraulic cement, sufficient water to form a pumpable slurry, a gas present in an amount sufficient to form a foam, a mildly set retarding mixture of cement composition foaming and foam stabilizing surfactants present in an effective amount, a cement set accelerating additive and a mildly set retarding cement water reducing additive or cement dispersing additive, or both, present in said composition in a weight ratio and in an amount such that the cement composition has a thickening time in the range of from about 3 to about 5 hours and develops compressive strength in the range of from about 400 psi to about 600 psi at a temperature in the range of from about 45° F. to about 55° F. within 24 hours; (b) placing the cement composition in the annulus between the casing and the well bore; and (c) allowing the cement composition to set into a hard impermeable mass therein.

Another method of the present invention for cementing a casing string in a deep water offshore formation penetrated by a well bore at a temperature in the range of from 32° F. to about 80° F. comprises the steps of: (a) preparing a cement composition comprised of a hydraulic cement, sufficient water to form a pumpable slurry, a gas present in an amount sufficient to form a foam, a mildly set retarding mixture of a cement composition foaming and foam stabilizing surfactants present in an effective amount, an aqueous solution of calcium chloride set accelerating additive and an aqueous solution of a sulfonated naphthalene formaldehyde condensate water reducing additive, wherein the calcium chloride accelerating additive and the sulfonated naphthalene formaldehyde condensate water reducing additive are present in said composition in a weight ratio and in an amount such that the cement composition has a thickening time in the range of from about 3 to about 5 hours and develops a compressive strength of at least about 400 psi within 24 hours; (b) pumping the cement composition into the annulus between the casing and the well bore; and (c) allowing the cement composition to set into a hard impermeable mass therein.

Yet another method of the present invention for cementing a casing string in a deep water offshore formation penetrated by a well bore is comprised of the steps of: (a) preparing a cement composition having a short transition time comprised of a hydraulic cement, a water reducing additive comprised of a sulfonated naphthalene-formaldehyde condensate present in an amount in the range of from about 0% to about 3% by weight of hydraulic cement in the composition, more preferably from about 0.3% to about 1.5%, a dispersing additive comprised of the condensation product of acetone, formaldehyde and sodium bisulfite present in an amount in the range of from about 0% to about 2% by weight of hydraulic cement in the composition, more preferably from about 0.1% to about 0.5%, a compressive strength development enhancing and set retarding additive comprised of a copolymer of acrylic acid and 2-acrylamido-2-methylpropane sulfonic acid present in an amount in the range of from about 0.01% to about 1% by weight of hydraulic cement in the composition, more preferably from about 0.01% to about 0.5%, a set accelerating additive present in an amount in the range of from about 0.1% to about 4% by weight of hydraulic cement in the composition, more preferably from 0.5% to about 3% and water present in an amount sufficient to form a pumpable slurry; (b) pumping the cement composition into the annulus between the casing and the well bore; and (c) allowing the cement composition to set into a hard impermeable mass therein.

Still another method of this invention is comprised of the steps of preparing a cement composition having a short transition time comprised of a hydraulic cement, a water reducing additive comprised of a sulfonated naphthalene-formaldehyde condensate present in an amount in the range of from about 0% to about 3% by weight of hydraulic cement in the composition, more preferably from about 0.3% to about 1.5%, a dispersing additive comprised of the condensation product of acetone, formaldehyde and sodium bisulfite present in an amount in the range of from about 0% to about 2% by weight of hydraulic cement in the composition, more preferably from about 0.1% to about 0.5%, a compressive strength development and set retarding additive comprised of a copolymer of acrylic acid and 2-acrylamido-2-methylpropane sulfonic acid present in an amount in the range of from about 0.01% to about 1% by weight of hydraulic cement in the composition, more preferably from about 0.01% to about 0.5%, a set accelerating additive present in an amount in the range of from about 0.1% to about 4% by weight of hydraulic cement in the composition, more preferably from 0.5% to about 3%, water present in an amount sufficient to form a pumpable slurry, a gas present in an amount sufficient to form a foam and a mixture of cement composition foaming and foam stabilizing surfactants present in an amount in the range of from about 0.1% to about 3% by weight of hydraulic cement in the composition, more preferably from about 0.3% to about 1%.

Calcium aluminate or one or more alkali metal aluminates can optionally be included in the cement composition of this method in an amount in the range of from about 0.5% to about 5% by weight of hydraulic cement in the composition.

The present invention also provides improved well cement compositions containing environmentally degradable additives and methods of cementing a casing string in a deep water offshore formation or zone penetrated by a well bore using the cement compositions. The cement compositions are comprised of a single hydraulic cement, water and additives which are all environmentally degradable and which can all be added to the water or cement slurry in liquid form. The cement compositions of this invention can be utilized over a broad temperature range, e.g., from about 32° F. to about 80° F. by simply changing the weight ratio and quantities of certain of the components in the compositions. Further, the cement compositions can meet the generally accepted requirements for cementing casing strings in deep water offshore wells, namely, a cement composition density in the range of from 10 to 12 pounds per gallon, a thickening time of from 3 to 5 hours and compressive strengths of from 400 psi to 600 psi at 45° F. to 55° F.

The improved well cement compositions of this invention which contain environmentally degradable additives are basically comprised of a single hydraulic cement, sufficient water to form a pumpable slurry, a water reducing and dispersing additive comprised of polyaspartic acid, a set retarding additive comprised of a lignosulfonate salt and a compressive strength and set accelerating additive comprised of a water soluble calcium salt.

The polyaspartic acid water reducing and dispersing additive is environmentally degradable and functions to allow the use of small amounts of water in the cement composition as well as to disperse the cement particles in the water to produce a useful slurry at low water concentrations. The polyaspartic acid used preferably has a molecular weight in the range of from about 500 to about 60,000 and is dissolved in water in an amount of about 40% by weight of the resulting solution. The aqueous polyaspartic acid solution is included in the cement composition in an amount in the range of from about 0.5% to about 5% by weight of the cement in the composition (the polyaspartic acid is present in an amount in the range of from about 0.2% to about 2% by weight of cement in the composition).

The lignosulfonate salt set retarding additive is also environmentally degradable and functions to increase the thickening time of the cement composition so that it remains pumpable for a sufficient time to be placed in the subterranean zone to be cemented. Useful lignosulfonate salts include sodium lignosulfonate, calcium lignosulfonate and ammonium lignosulfonate with sodium lignosulfonate being preferred. The lignosulfonate salt is preferably dissolved in water in an amount of about 33% by weight of the resulting solution. The aqueous lignosulfonate salt solution is included in the cement composition in an amount in the range of from about 0.05% to about 0.5% by weight of the cement in the composition (the lignosulfonate salt is present in an amount in the range of from about 0.0165% to about 0.165% by weight of cement in the composition).

While a variety of environmentally degradable cement compressive strength and set accelerating additives can be utilized in the cement compositions of this invention, a water soluble calcium salt such as calcium chloride, calcium nitrite and calcium formate is preferred with calcium chloride being the most preferred. The environmentally degradable compressive strength and set accelerating additive is also preferably dissolved in fresh water so that it can be added to the mix water or cement slurry on location. Most preferably, the environmentally degradable set accelerating additive is in the form of an aqueous solution wherein the compressive strength and set accelerating additive is present therein in an amount of about 33% by weight of the solution. The environmentally degradable aqueous compressive strength and set accelerating additive solution is included in the cement composition in an amount in the range of from about 1% to about 12% by weight of cement in the composition (the additive is present in an amount in the range of from about 0.33% to about 4% by weight of cement in the composition.

Various foaming and foam stabilizing additives which are environmentally degradable can be utilized in accordance with this invention. A preferred such environmentally degradable additive is hydrolyzed keratin. Keratin is the structural protein of epithelial cells in the outermost layers of skin. Hydrolyzed keratin is manufactured by the base hydrolysis of hoof and horn meal. That is, the hoof and horn meal is heated with lime in an autoclave to produce a hydrolyzed protein. The amino acid content, i.e., the number of gram molecules of amino acid per 1000 grams of protein, is as follows: Lysine-6.2; Histidine-19.7; Arginine-56.9; Aspartic Acid[1]-51.5; Threonine-55.9; Serine-79.5; Glutamic Acid-99; Proline-58.3; Glycine-78; Alanine-43.8; Half cystine-105; Valine-46.6; Methionine-4; Isoleucine-29; Leucine-59.9; Tryosine-28.7; Phenylalanine-22.4; Hydroxyproline-12.2; Hydroxylsine-1.2; Total-863; Average residual weight-117. The protein is commercially available as a free flowing powder that contains about 85% protein. The non-protein portion of the powder consists of about 0.58% insoluble material with the remainder being soluble non-protein materials primarily made up of calcium sulfate, magnesium sulfate and potassium sulfate. As mentioned above, hydrolyzed keratin is environmentally degradable and harmless to the environment. The hydrolyzed keratin protein powder is preferably predissolved in fresh water in an amount of about 50% by weight of the solution. Hydrolyzed keratin is preferably included in a foamed cement composition of this invention in an amount in the range of from about 1% to about 5% by volume of the water in the foamed cement composition (from about 2% to about 10% of a 50% by weight solution of the hydrolyzed keratin).

Another environmentally degradable foaming and foam stabilizing additive that can be utilized in accordance with this invention is a mixture of a ethoxylated alcohol ether sulfate of the formula

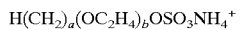
$$H(CH_2)_a(OC_2H_4)_bOSO_3NH_4^+$$

Wherein a is an integer in the range of from about 6 to about 10 and b is an integer in the range of from about 3 to about 10; an alkyl or alkene amidopropyl betaine having the formula

$$R—CONHCH_2CH_2CH_2N^+(CH_3)_2CH_2CO_2^-$$

wherein R is a radical selected from the group of decyl, cocoyl, lauryl, cetyl and oleyl; and an alkyl or alkene amidopropyl dimethyl amine oxide having the formula

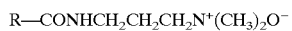
$$R—CONHCH_2CH_2CH_2N^+(CH_3)_2O^-$$

wherein R is a radical selected from the group of decyl, cocoyl, lauryl, cetyl and oleyl.

The ethoxylated alcohol ether sulfate is generally present in the above described mixture in an amount in the range of from about 60 to 64 parts by weight. The alkyl or alkene amidopropyl betaine is generally present in the additive in an amount in the range of from about 30 to about 33 parts by weight and the alkyl or alkene aminopropyl dimethyl amine oxide is generally present in the additive in an amount in the range of from about 3 to about 10 parts by weight. The surfactant mixture is preferably combined with fresh water in an amount of about 50% by weight of the solution.

A particularly suitable mixture of the above described environmentally degradable foaming and foam stabilizing surfactants is comprised of ethoxylated alcohol ether sulfate present in the mixture in an amount of about 63.3 parts by weight; the alkyl or alkene amidopropyl betaine is cocoylamidopropyl betaine and is present in the mixture in an amount of about 31.7 parts by weight; and the alkyl or alkene amidopropyl dimethylamine oxide is cocoylamidopropyl dimethylamine oxide and is present in the mixture in an amount of about 5 parts by weight. The mixture of environmentally degradable foaming and foam stabilizing surfactants is generally included in a foamed cement composition of this invention in an amount in the range of from about 1% to about 5% by volume of the water in the foamed cement composition (from about 2% to about 10% of a 50% by weight solution of said mixture of surfactants).

The foamed cement slurries of this invention may be prepared in accordance with any of the mixing techniques utilized in the art. In one preferred method, a quantity of water is introduced into a cement blender followed by the liquid additives other than the foaming and foam stabilizing additive followed by the hydraulic cement utilized. The mixture is agitated for a sufficient period of time to form a pumpable non-foamed slurry. The slurry is then pumped to the well bore, and the liquid foaming and foam stabilizing additive followed by the gas utilized are injected into the slurry on the fly. As the slurry and gas flow through the well bore to the location where the foamed cement composition is to be placed, the slurry is foamed.

As will be understood by those skilled in the art, in specific applications and at specific depths in deep water offshore wells, other additives, preferably in liquid form, which are well known to those skilled in the art and which do not adversely affect the required properties of the cement composition can be included therein. Examples of such additives include but are not limited to fluid loss control additives, viscosifying agents, thixotropic agents and anti-settling agents.

A method of the present invention for cementing a casing string or the like in a well bore is comprised of the steps of: (a) preparing a cement composition comprised of a single hydraulic cement, sufficient water to form a pumpable slurry, a water reducing and dispersing additive, a set retarding additive and a compressive strength and set accelerating additive, said additives being environmentally degradable and being present in amounts such that the cement composition has a required thickening time in the range of from about 3 to about 5 hours, and develops compressive strength in the range of from about 400 psi to about 600 psi at a temperature in the range of from about 45° F. to about 55° F. within 24 hours or less; (b) placing the cement composition in the annulus between the casing string and the well bore; and (c) allowing the cement composition to set into a hard impermeable mass therein.

Another method of the present invention which is particularly suitable for cementing a casing string in a deep water offshore formation or zone penetrated by a well bore is comprised of the steps of: (a) preparing a cement composition comprised of a single hydraulic cement, sufficient water to form a pumpable slurry, a gas present in an amount sufficient to form a foam, a liquid cement composition foaming and foam stabilizing additive present in an effective amount, a liquid water reducing and dispersing additive, and a liquid compressive strength and set accelerating additive, said additives being environmentally degradable and being present in said composition in amounts such that the cement composition has a thickening time in the range of from about 3 to about 5 hours, and develops compressive strength in the range of from about 400 psi to about 600 psi at a temperature in the range of from about 45° F. to about 55° F. within 24 hours; (b) placing the cement composition in the annulus between the casing string and the well bore; and (c) allowing the cement composition to set into a hard impermeable mass therein.

Yet another method of the present invention for cementing a casing string in a deep water offshore formation penetrated by a well bore at a temperature in the range of from 32° F. to about 80° F. comprises the steps of: (a) preparing a cement composition comprised of a single hydraulic cement comprised of Portland cement, sufficient water to form a pumpable slurry, a gas present in an amount sufficient to form a foam, a liquid environmentally degradable cement composition foaming and foam stabilizing additive comprised of hydrolyzed keratin or a mixture of surfactants comprised of 63.3 parts by weight of ethoxylated alcohol ether sulfate, 31.7 parts by weight of cocoylamidopropyl betaine and 5 parts by weight of cocoylamidopropyl dimethylamine oxide present in an effective amount, a liquid environmentally degradable water reducing and dispersing additive comprised of polyaspartic acid, a liquid environmentally degradable set retarding additive comprised of sodium lignosulfate and a liquid environmentally degradable compressive strength and set accelerating additive comprised of calcium chloride, said additives being present in amounts such that the cement composition has a thickening time in the range of from about 3 to about 5 hours and develops a compressive strength of at least about 400 psi within 24 hours; (b) pumping the cement composition into the annulus between the casing string and the well bore; and (c) allowing the cement composition to set into a hard impermeable mass therein.

Still another method of the present invention for cementing a casing string in a deep water offshore formation penetrated by a well bore is comprised of the steps of: (a) preparing a cement composition comprised of a hydraulic cement, sufficient water to form a pumpable slurry, a gas present in an amount sufficient to form a foam, a liquid environmentally degradable cement composition foaming and foam stabilizing additive comprised of hydrolyzed keratin or a mixture of surfactants comprised of 63.3 parts by weight of ethoxylated alcohol ether sulfate, 31.7 parts by weight of cocoylamidopropyl betaine and 5 parts by weight of cocoylamidopropyl dimethylamine oxide present in an amount in the range of from about 1% to about 5% by volume of water in the composition, a liquid environmentally degradable water reducing and dispersing additive comprised of polyaspartic acid present in an amount in the range of from about 0.5% to about 5% by weight of cement in the composition, a liquid environmentally degradable set retarding additive comprised of sodium lignosulfonate present in an amount in the range of from about 0.05% to about 0.5% by weight of cement in the composition and a liquid environmentally degradable compressive strength and set accelerating additive comprised of calcium chloride present in an amount in the range of from about 1% to about 12% by weight of cement in the composition; (b) pumping the cement composition into the annulus between the casing and the well bore; and (c) allowing the cement composition to set into a hard impermeable mass therein.

Calcium aluminate or one or more alkali metal aluminates can optionally be included in the cement compositions of the above described methods in an amount in the range of from about 0.5% to about 5% by weight of hydraulic cement in the composition to shorten the transition time of the cement composition.

In order to further illustrate the methods of the present invention, the following examples are given.

EXAMPLE 1

Test foamed cement compositions of this invention were prepared comprised of API Class H Portland cement, synthetic seawater, air, a mixture of cement composition foaming and foam stabilizing surfactants, an aqueous solution of a cement set accelerating additive and an aqueous solution of a mildly set retarding cement water reducing additive. The identities and quantities of the various components in the test samples are given in Table I below. The test compositions were tested for compressive strengths at 45° F. and 55° F. after curing for 24 hours using Tinius Olsen loading press equipment and for thickening time at 65° F. and 1,000 psi in accordance with the procedures described in the above mentioned API Specification 10. The results of these tests are given in Table I below.

nic acid derivative or mixture of such derivatives. Such a cement composition retarder is described in U.S. Pat. No. 4,676,832 issued to Childs et al. on Jun. 30, 1987, which is incorporated herein by reference. Other of the test compositions included calcium aluminate in various amounts to further shorten the transition time. The identities and quantities of the various components in the test samples are given in Table II below.

The test cementing compositions were mixed at normal densities and then foamed to reduce the densities of the compositions to in the range of from 10 to 12 pounds per gallon. Each of the test compositions was tested for thickening time in the temperature range of from 65° F. to 150° F. A measure of the transition time for each test composition was obtained by determining the time required for the consistency of the cement composition to increase from 30 $B_c$ (Bearden units) to 70 $B_c$ followed by measuring the time required for the cement composition to increase from 70 $B_c$ to 100 $B_c$. The thickening time tests were run in accordance with the procedure set forth in *API Specification For Materials And Testing For Well Cements*, API Specification 10, Fifth Edition, dated Jul. 1, 1990 of the American Petroleum Institute. In accordance with API Specification 10A, a cement slurry is considered to have set when it reaches a consistency of 100 $B_c$. It is also recognized in the art that a cement slurry begins to develop gel strength when it reaches a consistency of 30 $B_c$, it is not considered to be pumpable when it exceeds a consistency of 50 $B_c$ and that a cement column loses its ability to transmit hydrostatic pressure when it reaches a consistency of 70 $B_c$. Thus, the transition

TABLE I

Compressive Strength and Thickening Time Tests

| Test Cement Composition No. | Mix Water in Cement Composition, % by weight of cement | Total Water[1] in Cement Composition, % by weight of cement | Mixture of Foaming and Stabilizing Surfactants, % by weight of water | Amount of Set Accelerating Additive[4], % by weight of cement | Amount of Mildly Set Retarding Densifying Additive[5], % by weight of cement | Density of Foamed Cement Composition, pounds per gallon | 24 Hour Compressive Strength at 45° F., psi | 24 Hour Compressive Strength at 55° F., psi | Thickening Time at 1000 psi and 65° F., hr:min |
|---|---|---|---|---|---|---|---|---|---|
| 1 | 34 | 37 | 2.25[2] | 3 | 1.5 | 12 | 459 | 535 | 4:54 |
| 2 | 34 | 38 | 2.25[2] | 3 | 2 | 12 | 390 | 580 | 5:40 |
| 3 | 34 | 38 | 2.25[2] | 4 | 1.5 | 12 | 450 | 670 | 5:05 |
| 4 | 34 | 39 | 2.25[2] | 4 | 2 | 12 | 420 | 630 | 4:57 |
| 5 | 34 | 39 | 1[3] | 5 | 2.25 | 12 | 495 | 822 | 4:43 |
| 6 | 33.5 | 40 | 1[3] | 6 | 2.25 | 12 | 489 | 755 | 3:54 |
| 7 | 34 | 38.5 | 1[3] | 4 | 2 | 12 | 345 | 682 | 5:51 |

[1] Water from liquid surfactant mixture and liquid accelerating and dispersing agent solutions included
[2] Ethoxylated alcohol ether sulfate and cocoylamidopropylbetaine
[3] Ethoxylated alcohol ether sulfate, cocoylamidopropylbetaine and cocoylamidopropyl dimethyl amine oxide
[4] 33% by weight aqueous solution of calcium chloride
[5] 33% by weight aqueous solution of sulfonated naphthalene formaldehyde condensate From Table I it can be seen that the test cement compositions of this invention meet the requirements for cementing in deep water offshore wells.

EXAMPLE 2

Additional test foamed cement compositions of this invention were prepared comprised of various API classes of Portland cement, a water reducing additive, a dispersing additive, a compressive strength enhancing and set retarding additive, synthetic seawater, air, and a mixture of cement composition foaming and foam stabilizing surfactants (a mixture of ethoxylated alcohol ether sulfate, cocoylamidopropylbetaine and cocoylamidopropyl dimethyl amine). Some of the test compositions also included a cement composition set retarder comprised of a methylenephosphotime is the time from when the cement composition begins to develop gel strength (30 $B_c$) to when the cement composition gel strength is strong enough to prevent formation fluid inflow (100 $B_c$).

In U.S. Pat. No. 5,806,594 issued to Stiles et al. on Sep. 15, 1998 (prior art), a foamed cement composition is described having a short transition time, i.e., a right angle set property. The prior art cement composition of Stiles et al. is comprised of Portland cement, plaster of Paris (calcium sulfate), an aqueous fluid, a foaming agent and a foam stabilizing agent. Such a prior art cement composition was prepared and tested as described above for comparison purposes. The quantities of the various components in the test samples and the test results are also given in Table II below.

TABLE II

Transition Time Tests

| Test Cement Composition No. | Hydraulic Cement, API Class | Mix Water[1] in Cement Composition, % by wt. of cement | Densifying Additive[2], % by wt. of cement | Dispersing Additive[3], % by wt. of cement | Compressive Strength Development Enchancing Additive[4], % by wt. of cement | Set Accelerating Additive[5], % by wt. of cement | Cement Set Retarder[6], % by wt. of cement | Calcium Aluminate, % by wt. of cement | Time From 30 $B_c$ to 70 $B_c$ at 65° F. | Time From 70 $B_c$ to 100 $B_c$ at 65° F. | API Thickening Time, hr:min |
|---|---|---|---|---|---|---|---|---|---|---|---|
| 1 | A[7] | 38 | — | 2 | — | — | — | — | 72 | 23 | 2:43 |
| 2 | A[7] | 38 | — | 2 | 0.3 | — | — | — | 45 | 18 | 4:05 |
| 3 | A[7] | 38 | — | 2 | 0.4 | — | — | — | 52 | 16 | 4:24 |
| 4 | A[7] | 38 | — | 2 | 0.5 | — | — | — | 49 | 16 | 4:50 |
| 5 | A[7] | 38 | — | 2 | 1 | — | — | — | 80 | 19 | 7:14 |
| 6 | A[7] | 39 | 1.95 | 0.65 | — | — | — | — | 30 | 16 | 2:44 |
| 7 | A[7] | 39 | 1.95 | — | — | 1.3 | — | — | 35 | 14 | 2:19 |
| 8 | A[7] | 36 | 1 | — | — | 4.0 | — | — | 39 | 7 | 4:11 |
| 9 | A[7] | 38 | — | 0.65 | — | 1.3 | — | — | 80 | 17 | 2:43 |
| 10 | A[7] | 38 | 1.5 | 0.5 | — | 1.0 | — | — | 27 | 17 | 3:28 |
| 11 | A[7] | 38 | 0.5 | 1.5 | — | 1.0 | — | — | 40 | 20 | 3:09 |
| 12 | A[7] | 34 | 3.75 | 1.25 | — | 2.5 | — | — | 17 | 3 | 4:02 |
| 13 | A[7] | 38 | 1 | 1 | 0.1 | 1 | — | — | 38 | 12 | 3:28 |
| 14 | A[7] | 34 | 1 | 1 | 1.5 | 7 | — | — | 22 | 10 | 3:00 |
| 15 | A[7] | 34 | 2 | 1 | 2 | 5 | — | — | 20 | 10 | 6:25 |
| 16 | A[7] | 35.4 | 3 | 1 | 0.2 | 3.8 | — | — | 32 | 9 | 3:24 |
| 17 | A[7] | 35.4 | 3.62 | 1.21 | 0.17 | 5 | — | — | 16 | 12 | 2:47 |
| 18 | A[7] | 33.5 | 3.75 | 1.25 | 0.5 | 5.5 | — | — | 24 | 8 | 2:55 |
| 19 | A[7] | 33.9 | 3.75 | 1.25 | 0.5 | 4.75 | — | — | 27 | 7 | 3:40 |
| 20 | A[7] | 32.8 | 3.75 | 1.25 | 1 | 6 | — | — | 20 | 5 | 3:15 |
| 21 | A[7] | 34 | 3.75 | 1.25 | 0.8 | 4.2 | — | — | 18 | 9 | 5:00 |
| 22 | A[7] | 35.3 | 3.36 | 1.12 | 0.16 | 3.36 | — | — | 25 | 3 | 4:09 |
| 23 | A[7] | 36.7 | 2.57 | 0.84 | 0.12 | 2.57 | — | — | — | 8 | 3:27 |
| 24 | A[7] | 34 | 3.75 | 1.25 | 0.25 | 4.75 | — | — | 19 | 6 | 3:38 |
| 25 | A[7] | 38 | 1 | 1 | — | 1 | 0.1 | — | 55 | 25 | 3:08 |
| 26 | A[7] | 38 | 1 | 1 | — | 1 | 0.15 | — | 25 | 30 | 4:26 |
| 27 | A[7] | 38 | 1.68 | 0.56 | 0.08 | 1.68 | — | — | 45 | — | 6:00 |
| 28 | A[8] | 38 | 1.05 | 0.34 | 0.05 | 1.55 | — | — | 55 | 15 | 4:19 |
| 29 | A[8] | 38 | 1.68 | 0.56 | 0.08 | 1.68 | — | 1 | <5 | 0 | 5:00 |
| 30 | A[8] | 38 | 1.68 | 0.56 | 0.06 | 1.68 | — | 1 | 30 | 0 | nd[11] |
| 31 | H | 34 | 1.26 | 0.42 | 0.024 | 4.26 | — | — | 60 | 20 | 4:55 |
| 32 | H | 34 | 1.26 | 0.42 | 0.024 | 4.26 | — | 1 | 43 | 90 | 3:50 |
| 33 | H | 34 | 1.26 | 0.42 | 0.024 | 4.26 | — | 3 | 8 | 0 | 4:00 |
| Prior Art[9] | C and CaSO$_4$ | 15.8[10] | — | — | — | — | — | — | 24 | 14 | 5.55 @ 70° F. |

[1]Synthetic seawater
[2]Sulfonated naphthalene-formaldehyde condensate, 33% solution
[3]Condensation product of sodium bisulfite, acetone and formaldehyde, 33% solution
[4]Copolymer of acrylic acid and 2-acrylamido-2-methylpropane sulfonic acid, 40% solution
[5]Calcium chloride, 33% solution
[6]Methylenephosphonic acid derivative
[7]Cement produced by Lehigh
[8]Cement produced by Lafarge
[9]U.S. Pat. No. 5,806,594
[10]Density in pounds per gallon
[11]nd means not determined From Table II it can be seen that the compositions of the present invention and particularly test compositions 14, 15, 17–24, 29, 30 and 33 have short transition times, all of which are shorter than the comparative prior art test cement composition.

EXAMPLE 3

The particle size of Portland Class A cement below 10 microns was determined. Thereafter, small test portions of the cement were mixed with a few drops of the various additives utilized in the cement compositions of this invention, i.e., a sulfonated naphthalene-formaldehyde condensate (Halliburton "CFR-2™"), a condensation product of acetone, formaldehyde and sodium bisulfite (Halliburton "CFR-3™") and calcium chloride. The resulting mixtures were then also tested for particle size. The results of these tests are set forth in Table III below.

TABLE III

Cement Particle Size Analysis In The Presence Of Various Additives

| Particle Size of Cement | Cement Without Additive, % | Cement With "CFR-2 ™," % | Cement With "CFR-3 ™," % | Cement With Calcium Chloride, % |
|---|---|---|---|---|
| ≤1 micron | 10.2 | 12 | 11.3 | 10.8 |
| ≤3 microns | 13 | 15.6 | 15 | 13.5 |
| ≤9.93 microns | 26.8 | 34.4 | 33.1 | 29.6 |

From Table III, it can be seen that the additives of this invention function to de-agglomerate the cement particles.

EXAMPLE 4

Foamed cement compositions were prepared comprised of Portland Class A hydraulic cement, sufficient water to form a pumpable slurry, air present in an amount sufficient to form a foam, a liquid environmentally degradable cement composition foaming and foam stabilizing additive comprised of a mixture of ethoxylated alcohol ether sulfate, cocoylamidopropyl betaine and cocoylamidopropyl dimethylamine oxide, a liquid environmentally degradable water reducing and dispersing additive comprised of polyaspartic acid of two different molecular weights, a liquid environmentally degradable set retarding additive comprised of sodium lignosulfonate and a liquid environmentally degradable compressive strength and set accelerating additive comprised of calcium chloride. The various foamed cement compositions were tested for thickening time and compressive strengths in accordance with the procedures set forth in the above mentioned API Specification 10. The components of the various cement compositions and their amounts are given in the Table below along with the test results.

TABLE IV

Thickening Times And Compressive Strengths Of Foamed Cement Compositions

| Test Cement Composition No. | Synthetic Sea Water | Liquid Foaming And Foam Stabilizing Additive,[1] % by volume of water | Liquid Water Reducing And Dispersing Additive,[2] % by weight of cement | Liquid Set Retarding Additive,[3] % by weight of cement | Liquid Compressive Strength And Set Accelerating Additive,[4] % by weight of cement | Slurry Density, lb/gal | Foamed Density, lb/gal | Thickening Time, hrs:min | Compressive Strength @ 50° F., psi |
|---|---|---|---|---|---|---|---|---|---|
| 1 | 40 | 1 | — | — | — | 16.4 | 12 | 3:50 | — |
| 2 | 40 | 1 | 1 (A) | — | — | 16.4 | 12 | 11:11 | — |
| 3 | 36 | 1 | 1 (A) | — | 6 | 16.4 | 12 | 8:00 | — |
| 4 | 36 | 1 | 1 (A) | — | 6 | 16.4 | 12 | 7:21 | — |
| 5 | 36 | 1 | 1 (A) | — | 8 | 16.4 | 12 | 3:40 | 180 |
| 6 | 40 | 1 | 1 (B) | — | — | 16.4 | 12 | 12:00 | — |
| 7 | 38 | 1 | 1 (B) | — | 4 | 16.4 | 12 | 5:40 | — |
| 8 | 36 | 1 | 0.75 (B) | — | 8 | 16.4 | 12 | 1:00 | — |
| 9 | 38 | 1 | 0.75 (B) | 0.25 | 4 | 16.4 | 12 | 2:39 | — |
| 10 | 38 | 1 | 0.75 (B) | 0.125 | 4 | 16.4 | 12 | 3:05 | — |
| 11 | 38 | 1 | 1 (B) | 0.125 | 4 | 16.4 | 12 | 4:55 | 382 |
| 12 | 37 | 1 | 1.2 (B) | 0.150 | 4.8 | 16.4 | 12 | — | 336 |

[1] 50% aqueous solution of a mixture of 63.3 parts by weight ethoxylated alcohol ether sulfate, 31.7 parts by weight cocoylamidopropyl betaine and 5 parts by weight cocoylamidopropyl dimethylamine oxide.
[2] 40% aqueous solution of polyaspartic acid having a molecular weight of (A) 3,000 or (B) 50,000
[3] 33% aqueous solution of sodium lignosulfonate
[4] 33% aqueous solution of calcium chloride From the above Table it can be seen that the cement compositions containing environmentally degradable additives have properties suitable for cementing casing strings in deep water offshore wells.

Thus, the present invention is well adapted to attain the objects and advantages mentioned as well as those which are inherent therein. While numerous changes may be made by those skilled in the art, such changes are encompassed within the spirit of this invention as defined by the appended claims.

What is claimed is:

1. A method of cementing comprising the steps of:
preparing a cement composition comprising a hydraulic cement, sufficient water to form a pumpable slurry, a gas present in an amount sufficient to form a foam, a mildly set retarding mixture of cement composition foaming and foam stabilizing surfactant, a cement set and strength accelerating agent, and a mildly set retarding cement dispersing agent, wherein said cement set and strength accelerating agent and said mildly set retarding cement dispersing agent are present in said composition in a weight ratio and an amount such that said cement composition has a thickening time in the range of from about 3 to about 5 hours and develops a compressive strength in the range of from about 400 psi to about 600 psi at a temperature in the range of from about 45° F. to about 55° F. within 24 hours; and
allowing said cement composition to set.

2. The method of claim 1 wherein said hydraulic cement in said cement composition is API Class H Portland cement or another cement which is equivalent thereto.

3. The method of claim 1 wherein said water is present in said cement composition in an amount in the range of from about 34% to about 40% by weight of hydraulic cement therein.

4. The method of claim 1 wherein said gas is selected from the group consisting of air and nitrogen.

5. The method of claim 1 wherein said gas is present in said cement composition in an amount sufficient to foam said cement composition and to lower the density thereof to in the range of from about 10 to about 12 pounds per gallon.

6. The method of claim 1 wherein said mildly set retarding mixture of foaming and foam stabilizing surfactants in said cement composition is selected from the group consisting of a mixture of an alcohol ether sulfate ethoxylated with from about 3 to about 10 moles of ethylene oxide and an alkyl or alkene amidopropylbetaine and a mixture of an alcohol ether sulfate ethoxylated with from about 3 to about 10 moles of ethylene oxide, an alkyl or alkene amidopropylbetaine and an alkyl or alkene amidopropyl dimethylamine oxide.

7. The method of claim 6 wherein said mildly set retarding mixture of cement composition foaming and foam stabilizing surfactants is present in an amount in the range of from about 0.5% to about 4% by weight of water in said composition.

8. The method of claim 1 wherein said cement set and strength accelerating agent is selected from the group consisting of calcium chloride, calcium nitrite, calcium formate and other water soluble calcium salts.

9. The method of claim 1 wherein said cement set and strength accelerating agent is added to said cement composition in the form of an aqueous solution wherein said accelerating agent is present therein in an amount of about 33% by weight of said solution.

10. The method of claim 1 wherein said mildly set retarding cement dispersing agent is selected from the group consisting of sulfonated naphthalene formaldehyde condensate and the condensation product of acetone, formaldehyde and sodium bisulfite.

11. The method of claim 10 wherein said mildly set retarding cement dispersing agent is added to said cement composition in the form of an aqueous solution wherein said dispersing agent is present in an amount of about 33% by weight of said solution.

12. The method of claim 1 wherein the weight ratio of said cement set and strength accelerating agent to said mildly set retarding cement dispersing agent in said compositions is in the range of from about 1:1 to about 3:1.

13. The method of claim 12 wherein said cement set and strength accelerating agent and said mildly set retarding cement dispersing agent together are present in an amount in the range of from about 1% to about 3% by weight of cement in said composition.

14. The method of claim 1 wherein except for said single hydraulic cement and said gas, each of the components of said cement composition is added to said composition in liquid form.

15. A method of cementing at a temperature in the range of from about 32° F. to about 80° F. comprising the steps of:
preparing a cement composition comprising a hydraulic cement; sufficient water to form a pumpable slurry; a gas present in an amount sufficient to form a foam; an aqueous solution of calcium chloride accelerating agent; and an aqueous solution of sulfonated naphthalene formaldehyde condensate dispersing agent; and
varying the ratio of said accelerating agent to said dispersing agent and the combined amount of said accelerating agent and said dispersing agent present in said composition to vary the thickening time and compressive strength of the composition, wherein said composition has a thickening time in the range of from about 3 to about 5 hours and develops a compressive strength of at least about 400 psi within 24 hours.

16. The method of claim 15 wherein said water is present in said cement composition in an amount in the range of from about 34% to about 40% by weight of hydraulic cement therein.

17. The method of claim 15 wherein said gas is nitrogen present in said cement composition in an amount sufficient to foam said cement composition and lower the density thereof to in the range of from about 10 to about 12 pounds per gallon.

18. The method of claim 15 wherein said mildly set retarding mixture of foaming and foam stabilizing surfactants in said cement composition is a mixture of an alcohol ether sulfate ethoxylated with from about 3 to about 10 moles of ethylene oxide, cocoylamidopropylbetaine and a cocoylamidopropyldimethyl amine oxide and is present in an amount in the range of from about 0.5% to about 4% by weight of water in said composition.

19. The method of claim 15 wherein said aqueous solutions of calcium chloride accelerating agent and sulfonated naphthalene formaldehyde condensate dispersing agent are each 33% by weight solutions.

20. The method of claim 15 wherein the weight ratio of said calcium chloride accelerating agent to said sulfonated naphthalene formaldehyde condensate dispersing agent in said cement composition is in the range of from about 1:1 to about 3:1.

21. The method of claim 20 wherein said calcium chloride accelerating agent and said sulfonated naphthalene formaldehyde condensate dispersing agent together are present in an active amount in the range of from about 1% to about 3% by weight of cement in said composition.

22. The method of claim 15 wherein except for said Portland cement and said gas, each of the components of said cement composition are added to said cement composition in liquid form.

23. A method of cementing comprising the steps of:
preparing a cement composition comprising a hydraulic cement, a water reducing additive comprised of a sulfonated naphthalene formaldehyde condensate, a dispersing additive comprised of the condensation product of acetone, formaldehyde and sodium bisulfite, a compressive strength enhancing and set retarding additive comprising a copolymer of acrylic acid and 2-acrylamido-2-methylpropane sulfonic acid, a set accelerating additive and water present in an amount sufficient to form a pumpable slurry; and
allowing said cement composition to set.

24. The method of claim 23 wherein said hydraulic cement is a Portland cement.

25. The method of claim 23 wherein said hydraulic cement is selected from the group consisting of API Classes A, C, H and G Portland cements.

26. The method of claim 23 wherein said water reducing additive is present in said composition in an amount in the range of from about 0% to about 3% by weight of said hydraulic cement in said composition.

27. The method of claim 23 wherein said dispersing additive is present in said composition in an amount in the range of from about 0% to about 2% by weight of said hydraulic cement in said composition.

28. The method of claim 23 wherein said compressive strength enhancing and set retarding additive is present in said composition in an amount in the range of from about 0.01% to about 1% by weight of said hydraulic cement in said composition.

29. The method of claim 23 wherein said set accelerating additive is a water soluble calcium salt selected from the group consisting of calcium chloride, calcium nitrate and calcium formate.

30. The method of claim 23 wherein said set accelerating additive is calcium chloride.

31. The method of claim 23 wherein said set accelerating additive is present in said composition in an amount in the range of from about 0.1% to about 4% by weight of said hydraulic cement in said composition.

32. The method of claim 23 wherein said cement composition further comprises an additive selected from the group consisting of calcium aluminate and one or more alkali metal aluminates.

33. The method of claim 32 wherein said additive is calcium aluminate present in said composition in an amount in the range of from about 0.5% to about 5% by weight of said hydraulic cement in said composition.

34. The method of claim 23 wherein said cement composition further comprises a gas in an amount sufficient to form a foam and a mixture of cement composition foaming and foam stabilizing surfactants present in an amount sufficient to facilitate the formation of and stabilize said foam.

35. The method of claim 34 wherein said gas is present in an amount sufficient to lower the density of said foam to in the range of from about 10 to about 12 pounds per gallon.

36. The method of claim 35 wherein said mixture of foaming and foam stabilizing surfactants in said cement composition is selected from the group consisting of a mixture of an alcohol ether sulfate ethoxylated with from about 3 to about 10 moles of ethylene oxide and an alkyl or alkene amidopropylbetaine and a mixture of an alcohol ether sulfate ethoxylated with from about 3 to about 10 moles of ethylene oxide, an alkyl or alkene amidopropylbetaine and an alkyl or alkene amidopropyl dimethylamine oxide.

37. The method of claim 36 wherein said mixture of cement composition foaming and foam stabilizing surfactants is present in an amount in the range of from about 0.1% to about 3% by weight of water in said composition.

38. The method of claim 37 wherein said cement composition further comprises an additive selected from the group consisting of calcium aluminate and one or more alkali metal aluminates.

39. A method of cementing comprising the steps of:
preparing a cement composition comprising a hydraulic cement, sufficient water to form a pumpable slurry, an environmentally degradable water reducing and dispersing additive, an environmentally degradable set retarding additive selected from the group consisting of sodium lignosulfonate, calcium lignosulfonate and ammonium lignosulfonate, said set retarding additive being present in an amount in the range of from about 0.0165% to about 0.165% by weight of cement in said composition, and an environmentally degradable compressive strength and set accelerating additive; and allowing said cement composition to set.

40. The method of claim 39 wherein said hydraulic cement is a Portland cement.

41. The method of claim 39 wherein said hydraulic cement is selected from the group consisting of API Classes A, C, H and G Portland cements.

42. The method of claim 39 wherein said water is selected from the group consisting of fresh water and salt water present in an amount in the range of from about 30% to about 45% by weight of cement in said composition.

43. The method of claim 39 wherein said water reducing and dispersing additive is polyaspartic acid present in an amount in the range of from about 0.2% to about 2% by weight of cement in said composition.

44. The method of claim 39 wherein said set retarding additive is sodium lignosulfonate.

45. The method of claim 39 wherein said compressive strength and set accelerating additive is selected from the group of calcium chloride, calcium nitrite and calcium formate and is present in an amount in the range of from about 0.33% to about 4% by weight of cement in said composition.

46. The method of claim 39 wherein said water reducing and dispersing additive, said set retarding additive and said compressive strength and set accelerating additive are present in amounts such that said cement composition has a thickening time in the range of from about 3 to about 5 hours, and a compressive strength from about 400 psi to about 600 psi at a temperature in the range of from about 45° F. to about 55° F. in 24 hours or less.

47. A method of cementing comprising the steps of:
preparing a composition comprised of a single hydraulic cement, sufficient water to form a pumpable slurry, a gas present in an amount sufficient to form a foam, an environmentally degradable foaming and foam stabilizing additive, an environmentally degradable water reducing and dispersing additive, an environmentally degradable set retarding additive and an environmentally degradable compressive strength and set accelerating additive; and allowing said cement composition to set.

48. The method of claim 47 wherein said hydraulic cement is a Portland or equivalent cement.

49. The method of claim 47 wherein said hydraulic cement is selected from the group consisting of API Classes A, C, H and G Portland cements.

50. The method of claim 47 wherein said water is selected from the group consisting of fresh water and salt water present in an amount in the range of from about 30% to about 45% by weight of cement in said composition.

51. The method of claim 47 wherein said gas is selected from the group of air and nitrogen present in an amount sufficient to foam the cement composition to a density in the range of from about 10 to about 12 pounds per gallon.

52. The method of claim 47 wherein said foaming and foam stabilizing additive is selected from the group consisting of hydrolyzed keratin and a mixture of 63.3 parts by weight of ethoxylated alcohol ether sulfate, 31.7 parts by weight of cocoylamidopropyl betaine and 5 parts by weight of cocoylamidopropyl dimethylamine oxide present in an amount in the range of from about 1% to about 5% by weight of water in said composition.

53. The method of claim 47 wherein said water reducing and dispersing additive is polyaspartic acid present in an amount in the range of from about 0.2% to about 2% by weight of cement in said composition.

54. The method of claim 47 wherein said set retarding additive is selected from the group consisting of sodium lignosulfonate, calcium lignosulfonate and ammonium lignosulfonate and is present in an amount in the range of from about 0.0165% to about 0.165% by weight of the cement in said composition.

55. The method of claim 54 wherein said set retarding additive is sodium lignosulfonate.

56. The method of claim 47 wherein said compressive strength and set accelerating additive is selected from the group of calcium chloride, calcium nitrite and calcium formate and is present in an amount in the range of from about 0.33% to about 4% by weight of cement in said composition.

57. The method of claim 47 wherein said water reducing and dispersing additive, said set retarding additive and said compressive strength and set accelerating additive are present in amount such that said cement composition has a thickening time in the range of from about 3 to about 5 hours, and a compressive strength from about 400 psi to about 600 psi at a temperature in the range of from about 45° F. to about 55° F. in 24 hours or less.

* * * * *